(12) United States Patent
Curtis

(10) Patent No.: US 7,512,568 B2
(45) Date of Patent: Mar. 31, 2009

(54) EVOLVABLE SYNTHETIC NEURAL SYSTEM

(75) Inventor: Steven A. Curtis, Dayton, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 11/109,400

(22) Filed: Apr. 8, 2005

(65) Prior Publication Data

US 2005/0240542 A1 Oct. 27, 2005

Related U.S. Application Data

(60) Provisional application No. 60/563,897, filed on Apr. 8, 2004, provisional application No. 60/566,226, filed on Apr. 23, 2004.

(51) Int. Cl.
*G06F 15/18* (2006.01)
*G05B 13/00* (2006.01)

(52) U.S. Cl. .................. 706/2; 700/28; 700/248; 700/61

(58) Field of Classification Search ............. 706/2; 700/28, 61, 248
See application file for complete search history.

(56) References Cited

U.S. PATENT DOCUMENTS

| | | | |
|---|---|---|---|
| 5,361,186 A | 11/1994 | Tanie et al. | |
| 5,484,031 A | 1/1996 | Koyachi et al. | |
| 5,762,153 A | 6/1998 | Zamagni | |
| 6,491,119 B1 | 12/2002 | Neu | |
| 2001/0054518 A1 | 12/2001 | Buehler et al. | |

OTHER PUBLICATIONS

Clark et al., From Present Surveying to Future Prospecting of the Asteroid Belt, 2004.*
Salomon, Radial Basis Function Networks for Autonomous Agent Control, 1997.*
Jun et al., Learning Robot Behaviours with Self-Organizing Maps and Radial Basis Function Networks, 2002.*
Curtis, S.A. et al., Ants: An Artificial Intelligence Approach to Asteriod Belt Resource Exploration, 51st International Astronautical Congress, Brazil, Oct. 2000.
Clark P.E. et al., Using Ants to Explore Small Body Populations in the Solar System, American Astronomical Society's Division of Planetary Sciences, BAAS, vol. 33, No. 3, 2001.
Clark P.E. et al., Ants: A New Concept for Very Remote Exploration With Intelligent Software Agents, American Geophysical Union, Dec. 10-14, 2001, EOS Trans.AGU,82 (47).
Clark P.E. et al., Ants: Exploring the Solar System with an Autonomous Nanotechnology Swarm, Presentation 1394 at Lunar Planetary Science XXXIII, 2002.

(Continued)

*Primary Examiner*—David R Vincent
*Assistant Examiner*—Nathan H Brown, Jr.
(74) *Attorney, Agent, or Firm*—Matthew Johnston

(57) ABSTRACT

An evolvable synthetic neural system includes an evolvable neural interface operably coupled to at least one neural basis function. Each neural basis function includes an evolvable neural interface operably coupled to a heuristic neural system to perform high-level functions and an autonomic neural system to perform low-level functions. In some embodiments, the evolvable synthetic neural system is operably coupled to one or more evolvable synthetic neural systems in a hierarchy.

24 Claims, 12 Drawing Sheets

OTHER PUBLICATIONS

Rilee M.L. et al, Onboard Science Software Enabling Future Space Science and Space Weather Missions, Paper 209, 2002 IEEE Aerospace Conference Big Sky, Montana, Mar. 9-16, 2002.

Clark P.E. et al., Revolutionizing Remote Exploration with Ants, (abstract P521-01) Spring Meeting of the American Geophysical Union, 2002.

Curtis S.A. et al., Use of Swarm Intelligence in Spacecraft Constellations for the Resource Exploration of the Asteroid Belt, 3rd National Workshop, Italy, Feb. 24-26, 2003.

Curtis S.A. et al., Ants for the Human Exploration and Development of Space, IEEE Aerospace Conference Big Sky, MT Mar. 8-15, 2003.

Clark P.E. et al., In Situ Surveying of Saturn's Rings, 2004 Lunar and Planetary Science Conference, Houston, Mar. 2004 (Poster).

Clark P.E. et al., From Present Surveying to Future Prospecting of the Asteroid Belt, 2004 Lunar and Planetary Science Conference, Houston, Mar. 2004 (Poster).

* cited by examiner

EVOLVABLE SYNTHETIC NEURAL SYSTEM

RELATED APPLICATIONS

This application claims the benefit of priority under 35 U.S.C. 119(e) of U.S. Provisional Patent Application No. 60/563,897 filed Apr. 8, 2004, entitled "Evolvable Neural Software System and Related Devices" and U.S. Provisional Patent Application No. 60/566,226 filed Apr. 23, 2004, entitled "Evolvable Neural Software System and Related Devices," each of which is incorporated herein by reference in its entirety.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates generally to artificial intelligence and, more particularly, to architecture for collective interactions between autonomous entities.

BACKGROUND OF THE INVENTION

A synthetic neural system is an information processing paradigm that is inspired by the way biological neural systems, such as the brain, process information. Synthetic neural systems are non-biological systems.

A key element of synthetic neural systems is the general architecture of the synthetic neural system. A synthetic neural system is composed of a large number of highly interconnected processing elements that are analogous to neurons in a brain working in parallel to solve specific problems. Unlike general purpose brains, a synthetic neural system is typically configured for a specific application, such as pattern recognition or data classification.

Synthetic neural systems derive meaning from complicated or imprecise data and are used to extract patterns and detect trends that are too complex to be noticed by either humans or other computer techniques. A trained synthetic neural system can be thought of as an "expert" in the category of information it has been given to analyze. This expert can then be used to provide projections given new situations of interest and answer "what if" questions.

Synthetic neural systems, like people, learn by example. The synthetic neural systems are adapted, changed and reconfigured through a learning process in which results are compared to goals and objectives, and changes are made to the synthetic neural system to hopefully conform future results of the synthetic neural system to the goals and objectives. Learning in both biological systems and synthetic neural systems involves adjustments to connections between the neurons.

Conventional synthetic neural systems have three fundamental problems that prevent such systems from adequately functioning in a manner similar to natural biological neural systems. The first problem of conventional synthetic neural systems is the inability to reconcile the three dimensional nature of biological neural systems with the two dimensional nature of microprocessor technologies. The second problem is the inability of conventional synthetic neural systems to actively rewire themselves in response to changing requirements, as do biological neural systems. The third problem with conventional synthetic neural systems is the inability to perform significant tasks with complete autonomy. Synthetic neural systems advantageously capture all of these characteristics to enable successful independent operation.

For the reasons stated above, and for other reasons stated below that will become apparent to those skilled in the art upon reading and understanding the present specification, there is a need in the art for a synthetic neural system that reconciles the two dimensional nature of microprocessor technologies to the three dimensional nature of biological neural systems. There is also a need for a synthetic neural system that adapts itself to changing external requirements. There is a further need for a synthetic neural system that performs significant tasks with complete autonomy.

BRIEF DESCRIPTION OF THE INVENTION

The above-mentioned shortcomings, disadvantages and problems are addressed herein, which will be understood by reading and studying the following specification.

In one aspect an evolvable synthetic neural system to manage collective interactions between autonomous entities includes a first plurality of neural basis functions and a first evolvable neural interface operably coupled to each of the first plurality of neural basis functions. This aspect solves the need for a synthetic neural system that reconciles the two dimensional nature of microprocessor technologies to the three dimensional nature of biological neural systems, satisfies the need for a synthetic neural system that adapts itself to changing external requirements, and satisfies the need in the art for a synthetic neural system that performs significant tasks with complete autonomy.

In another aspect, an evolvable synthetic neural system to manage collective interactions between autonomous entities includes a first plurality of neural basis functions, further comprising a ruler neural basis function that is capable of establishing and removing links to other similarly configured evolvable synthetic neural systems, and a first evolvable neural interface operably coupled to each of the first plurality of neural basis functions.

In yet another aspect, an evolvable synthetic neural system includes at least one neural basis function. Each neural basis function includes an evolvable neural interface, a heuristic neural system operably coupled to the evolvable neural interface, and an autonomic neural system operably coupled to the evolvable neural interface. The heuristic neural system and the autonomic neural system in aggregate provide a function of a biological neural system.

In a further aspect, an autonomous nanotechnology swarm includes a first worker composed of self-similar components, and a second worker composed of self-similar components. As used herein, "self-similar" means having the same structure. According to one aspect, the invention provides a multi-level system in which each level has the same structure.

In yet a further aspect, a heuristic neural system includes a neural net operable to perform pattern recognition, and a fuzzy logic package operable to perform decisions based on recognitions.

In still yet a further aspect, an autonomic neural system is operable to represent smart servo system behavior and perform low-level functions.

In still yet another aspect, a process to construct an environment to satisfy increasingly demanding external requirements includes instantiating an embryonic evolvable neural interface and evolving the embryonic evolvable neural interface towards complex complete connectivity. As used herein, "instantiating" means initially providing.

Another aspect of the invention is directed to a computer-accessible medium having executable instructions to manage collective interactions between autonomous entities. The computer-accessible medium includes computer executable program code to generate algorithms to manage the collective interactions between autonomous entities. The algorithms include a first plurality of neural basis functions controlling a corresponding robotic device in turn controlling at least one action in response to sensory input data; and a first evolvable neural interface operably coupled to each of the first plurality of neural basis functions to selectively establish communication between said first plurality of neural basis functions. One of the neural basis functions is autonomously reconfigured during a learning process in response to selectively established communication with a second neural basis functions to thereafter change the control of the robotic device.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

The accompanying drawings, which are incorporated in and constitute a part of this specification, illustrate several exemplary embodiments of the invention and together with the description, serve to explain the principles of the invention. In the drawings.

DETAILED DESCRIPTION OF EXEMPLARY EMBODIMENTS

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into six sections. In the first section, a system level overview is described. In the second section, apparatus embodiments are described. In the third section, embodiments of methods are described. In the fourth section, hardware and the operating environments in conjunction with which embodiments may be practiced are described. In the fifth section, particular implementations are described. Finally, in the sixth section, a conclusion of the detailed description is provided.

System Level Overview

Figure 1:
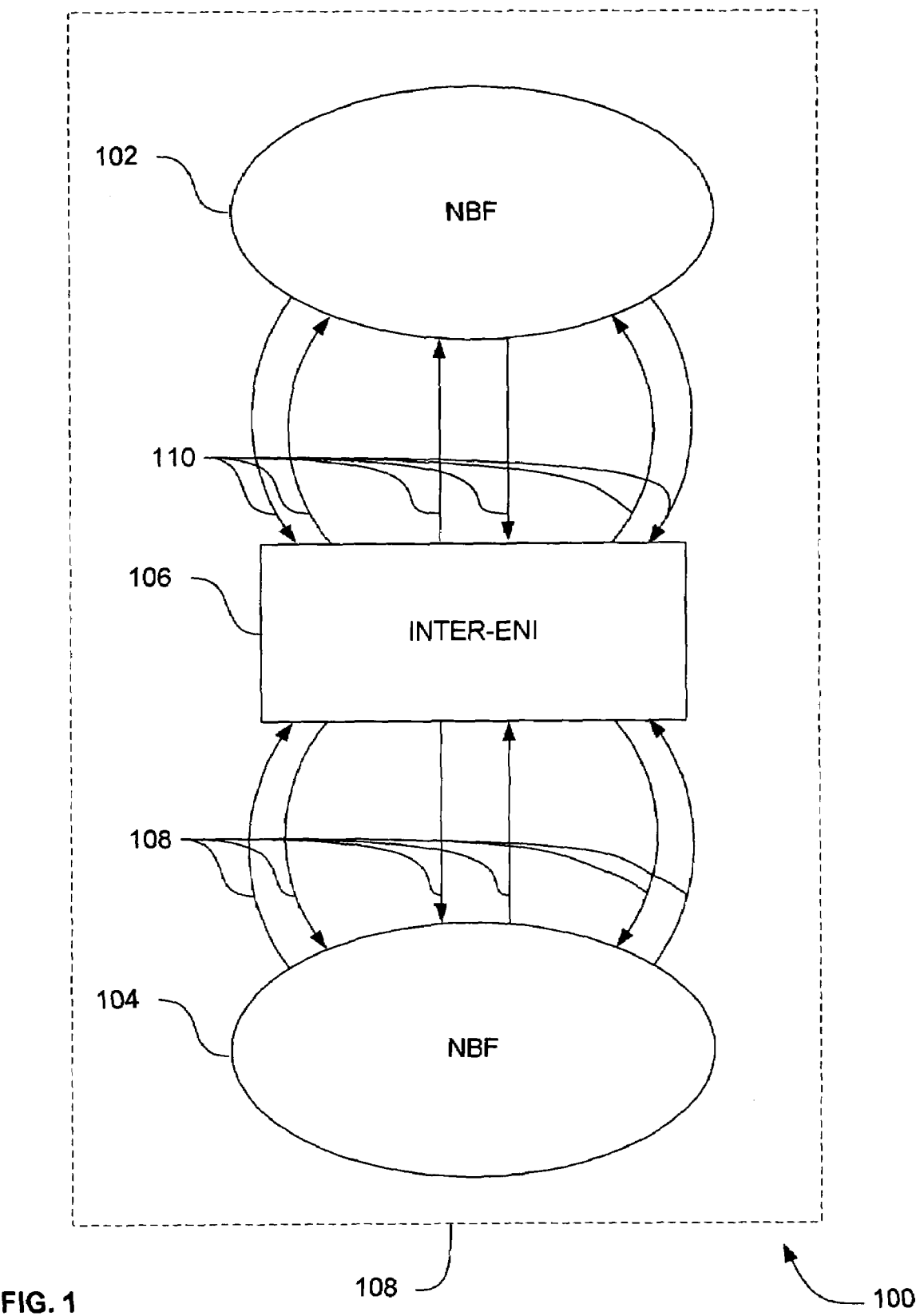
FIG. 1 is a block diagram of an embodiment of an evolvable synthetic neural system according to the present invention.

FIG. 1 is a block diagram that provides an overview of an evolvable synthetic neural system to manage collective interactions between autonomous entities. As shown in FIG. 1, system 100 includes a first plurality of neural basis functions (NBFs) 102 and 104. NBFs are a building block of system 100. In some embodiments of system 100, the plurality of NBFs includes more than the two NBFs 102 and 104 shown in FIG. 1. In some embodiments, system 100 includes only one NBF. One embodiment of a NBF is discussed below with reference to FIG. 2.

System 100 also includes a first inter-evolvable neural interface (ENI) 106 that is operably coupled to each of the first plurality of neural basis functions. The NBFs 102 and 104 are highly integrated, and coupling between the NBFs through the ENI 106 provides a three dimensional complexity. Thus, when system 100 is implemented on microprocessors, such as microprocessor 904 discussed below with reference to FIG. 9, system 100 provides a synthetic neural system that reconciles the two dimensional nature of microprocessor technologies to the three dimensional nature of biological neural systems.

This embodiment of the inter-ENI 106 is known as an inter-NBF ENI because the inter-ENI 106 is between or among the NBFs 102 and 104 at the same level within a hierarchy. System I00 shows only one level 108 of a hierarchy.

System 100 may operate autonomously. ENI 106 adapts system 100 by instantiating new NBFs and ENIs and-establishing operable communication paths 110 to the new NBFs and the ENIs to system 100. ENI 106 also adapts system 100 by removing or disabling the operable communication paths 110 to the new NBFs and ENIs. The adapting, establishing, removing and disabling of the communication paths 110 is performed autonomously. Thus system 100 satisfies the need for a synthetic neural system that performs significant tasks with complete autonomy.

System 100 is capable of establishing and removing links to other similarly configured systems (not shown). Thus the system 100 is self-similar.

The system level overview of the operation of an embodiment is described in this section of the detailed description. Some embodiments operate in a multi-processing, multi-threaded operating environment on a computer, such as computer 902 in FIG. 9.

While the system 100 is not limited to any particular NBF or ENI, for sake of clarity simplified NBFs and a simplified ENI are described.

Apparatus Embodiments

In the previous section, a system level overview of the operation of an embodiment is described. In this section, particular apparatus of such an embodiment are described by reference to a series of block diagrams. Describing the apparatus by reference to block diagrams enables one skilled in the art to develop programs, firmware, or hardware, including such instructions to implement the apparatus on suitable computers, executing the instructions from computer-readable media.

Figure 9:
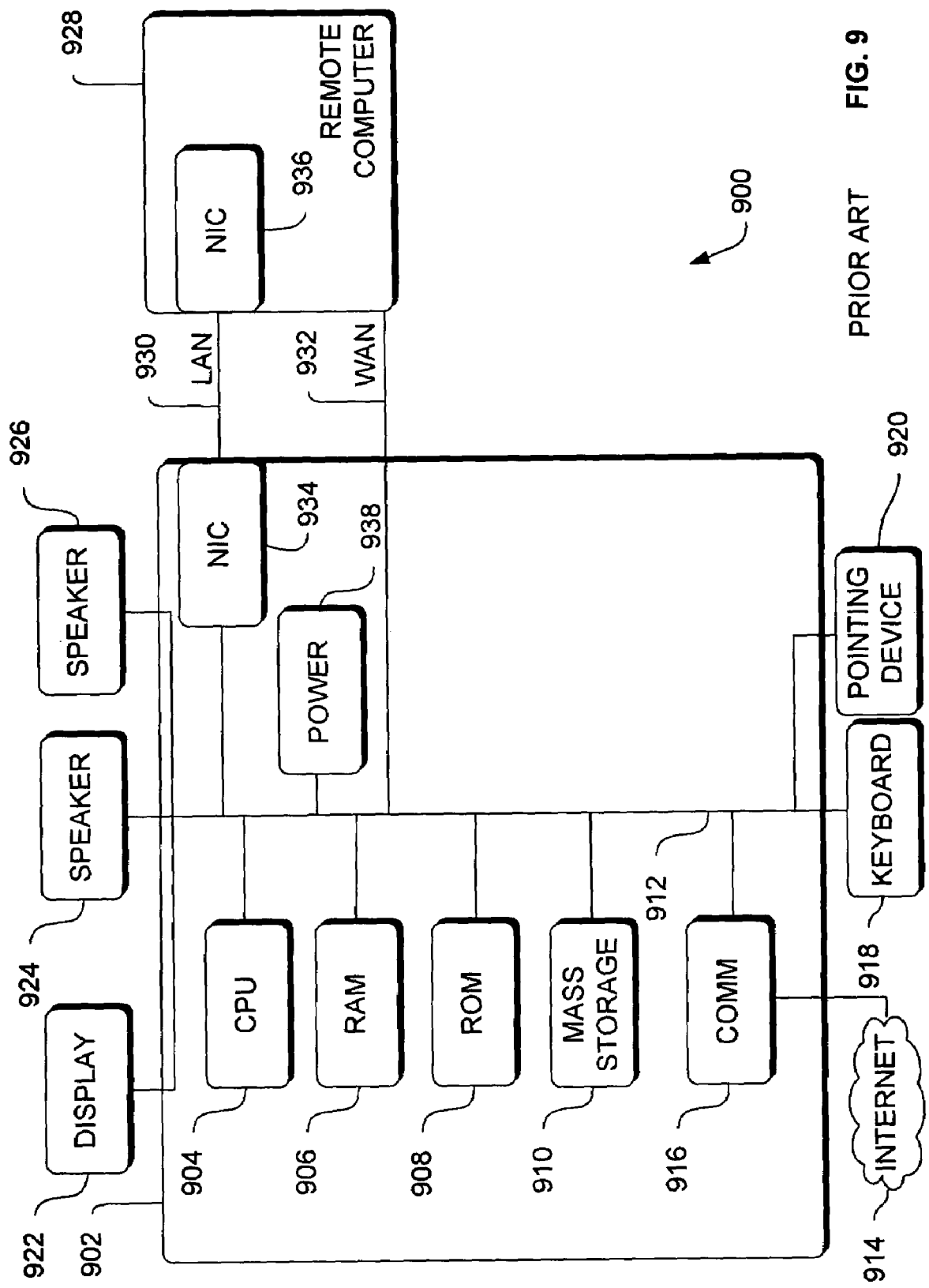
FIG. 9 is a block diagram of a conventional hardware and operating environment in which different embodiments of the present invention can be practiced.

In some embodiments, apparatus 200-600 are implemented by a program executing on, or performed by firmware or hardware that is a part of a computer, such as computer 902 in FIG. 9.

Figure 2:
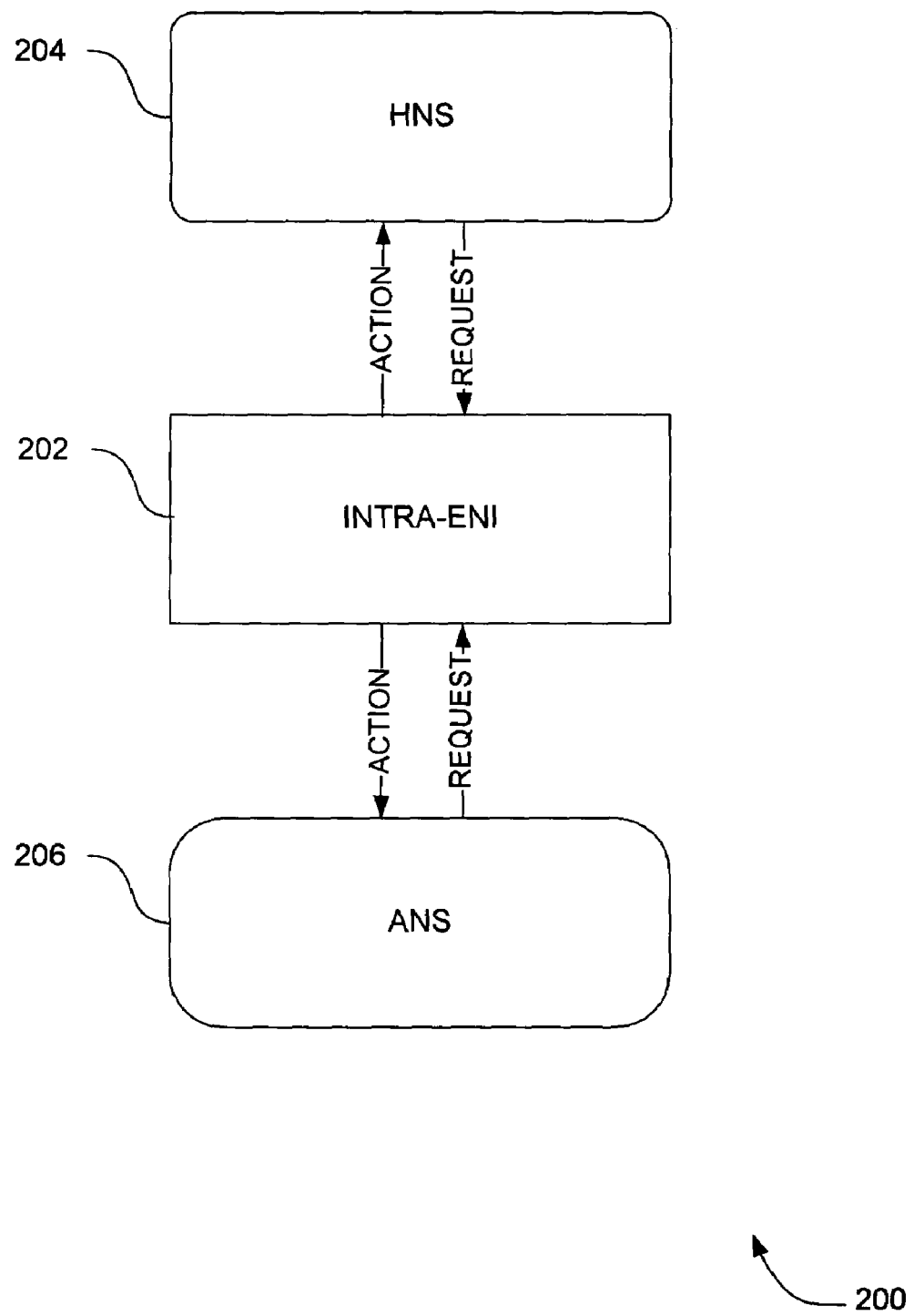
FIG. 2 is a block diagram of an embodiment of a neural basis function of a worker according to the present invention.

FIG. 2 is a block diagram of a neural basis function (NBF) 200 of a worker according to an embodiment. NBF 200 is a bilevel neural system because both high-level functions and low-level functions are performed by NBF 200.

NBF 200 includes an intra-evolvable neural interface (intra-ENI) 202. The ENI 202 is operably coupled to a heuristic neural system (HNS) 204 and operably coupled to an autonomic neural system (ANS) 206. The HNS 204 performs high-level functions and the ANS 206 performs low-level functions that are often described as "motor functions." In NBF 200, the HNS 204 and the ANS 206 in aggregate provide a function of a biological neural system. The intra-ENI 202 is an ENI that is wholly contained within an NBF, and is therefore prefixed with "intra."

The intra-ENI 202 sends action messages to and receives request messages from the HNS 204 and the ANS 206 during learning and task execution cycles, as well as during interfacing operations between the intra-ENI and the HNS 204 and the ANS 206 when the HNS 204 and the ANS 206 need to be modified as a result of other system failures or modification of objectives. NBF 200 is a worker NBF because this NBF performs functions, but does not provide instructions commands to other NBFs.

Figure 3:
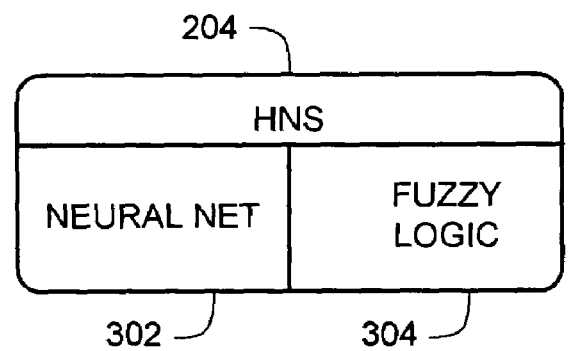
FIG. 3 is a block diagram of an embodiment of a heuristic neural system according to the present invention.
Figure 3:
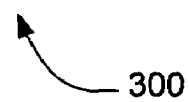

FIG. 3 is a block diagram of a heuristic neural system 300 according to an embodiment.

The heuristic neural system (HNS) 300 is composed of a neural net 302 for pattern recognition and a fuzzy logic package 304 to perform decisions based on recognitions. Taken together the neural net 302 and the fuzzy logic package 304 form a basis for a higher level heuristic intelligence.

Figure 4:
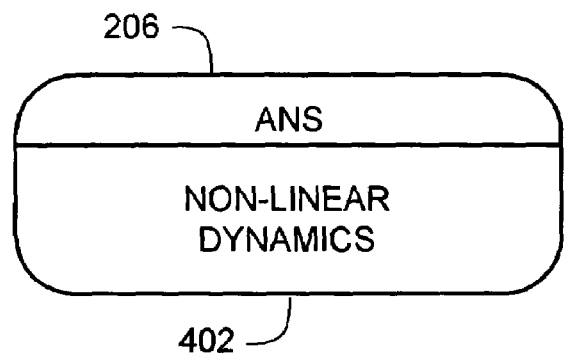
FIG. 4 is a block diagram of an embodiment of an autonomic neural system according to the present invention.

FIG. 4 is a block diagram of an autonomic neural system 400 according to an embodiment.

Figure 5:
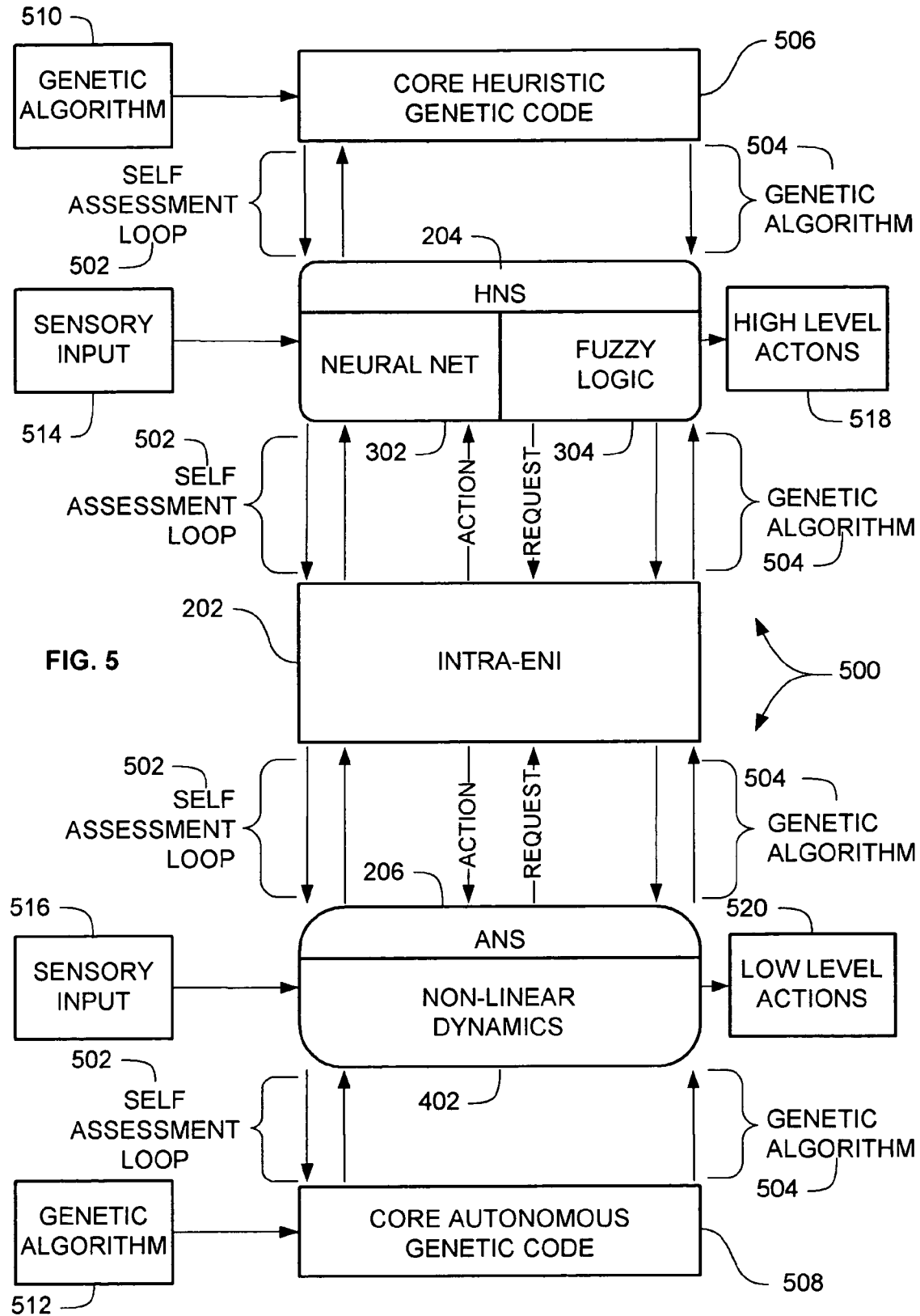
FIG. 5 is a block diagram of an embodiment of a neural basis function of a worker according to the present invention.

The autonomic neural system (ANS) 400 includes a nonlinear dynamics simulation 402 that represents smart servo system behavior. FIG. 5 is a block diagram of a neural basis function (NBF) 500 of a worker according to an embodiment. NBF 500 is a bilevel neural system.

FIG. 5 is a block diagram of a neural basis function (NBF) 500 of a worker according to an embodiment. NBF 500 is a bilevel neural system.

In some embodiments, NBF 500 includes a self assessment loop (SAL) 502 at each interface between components. Each SAL 502 continuously gauges efficiency of operations of the combined HNS 204 and ANS 206. The standards and criteria of the efficiency are set or defined by objectives of the NBF 500.

In some embodiments, NBF 500 also includes genetic algorithms (GA) 504 at each interface between components. The GAs 504 modify the intra-ENI 202 to satisfy requirements of the SALs 502 during learning, task execution or impairment of other subsystems.

Similarly, the HNS 204 has a SAL 502 interface and a GA 504 interface to a core heuristic genetic code (CHGC) 506, and the ANS 206 has a SAL 502 interface and a GA 504 interface to a core autonomic genetic code (CAGC) 508. The CHGC 506 and CAGC 508 allow modifications to a worker functionality in response to new objectives or injury. The CHGC 506 and the CAGC 508 elements are not part of an operational neural system, but rather store architectural constraints on the operating neural system for both parts of the bilevel system. The CHGC 506 and the CAGC 508 are both modifiable depending on variations in sensory inputs via GAs 504.

In some embodiments, the CHGC 506 and the CAGC 508 in conjunction with SALs 502 and GAs 504 are generalized within this self similar neural system to reconfigure the relationship between NBFs as well as to permit the instantiation of new NBFs to increase the overall fitness of the neural system. Thus, NBF 500 provides a form of evolution possible only over generations of workers.

In some embodiments, NBF 500 also includes genetic algorithms 510 and 512 that provide process information to the CHGC 506 and the CAGC 508, respectively. HNS 204 and ANS 206 receive sensory input 514 and 516, respectively, process the sensory input and generate high level actions 518 and low level actions 520, respectively.

Figure 6:
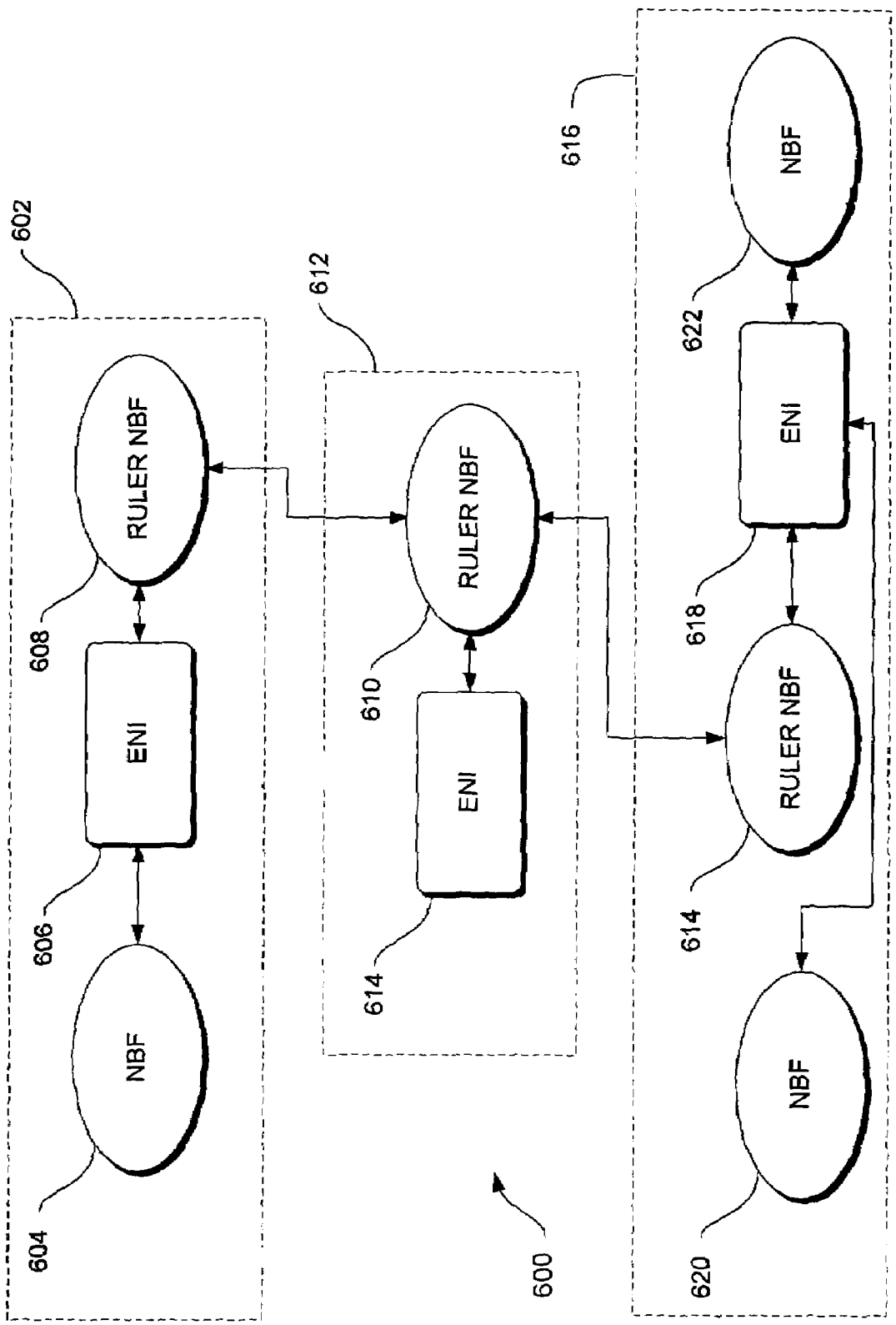
FIG. 6 is a block diagram of an embodiment of a multiple level hierarchical evolvable synthetic neural system according to the present invention.

FIG. 6 is a block diagram of a multiple level hierarchical evolvable synthetic neural system (ESNS) 600 according to an embodiment.

The multiple level hierarchical ESNS 600 includes a first level of hierarchy 602 that includes a NBF 604 and inter-ENI 606 and also a ruler NBF 608. A ruler NBF, such as ruler NBF 608, performs functions and also provides instructions and/or commands to other subordinate NBFs.

The ruler NBF 608 of the first hierarchical level 602 is operably coupled to a ruler NBF 610 in a second hierarchical level 612. Ruler NBF 610 performs functions and receives instructions and commands from other ruler NBFs that are higher in the hierarchy of the ESNS 600 and also provides instructions and/or commands to other subordinate NBFs.

The second hierarchical level 612 also includes an inter-ENI.614. The second hierarchical level 612 shows the embodiment of an ESNS 600 having one NBF operably coupled to an ENI. The ruler NBF 610 of the second hierarchical level 612 is operably coupled to a ruler NBF 614 in a third hierarchical level 616.

The third hierarchical level 616 also includes an inter-ENI 618. The third hierarchical level 616 shows the embodiment of an ESNS 600 having more than two NBFs (e.g. 614, 620 and 622) operably coupled to an ENI.

In some embodiments, the NBFs 604, 608, 610, 614, 620 and 622 include the aspects of NBFs 102 and 104 in FIG. 1 above, and/or NBF 200 in FIG. 2 above.

Method Embodiments

In the previous section, apparatus embodiments are described. In this section, particular methods of such embodiments are described by reference to a series of flowcharts. Describing the methods by reference to a flowchart enables one skilled in the art to develop such programs, firmware, or hardware, including such instructions to carry out the methods on suitable computers executing the instructions from computer-readable media. Similarly, the methods performed by the server computer programs, firmware, or hardware are also composed of computer-executable instructions. In some embodiments, method 700 is performed by a program executing on, or performed by firmware or hardware that is a part of a computer, such as computer 902 in FIG. 9.

Figure 7:
FIG. 7 is a flowchart of a method to construct an environment to satisfy increasingly demanding external requirements according to the present invention.

FIG. 7 is a flowchart of a method 700 to construct an environment to satisfy increasingly demanding external requirements according to an embodiment.

Method 700 includes instantiating 702 an embryonic evolvable neural interface (ENI), such as inter-ENI 106. The embryonic ENI lacks a complete specification of the operational characteristics of the ESNS or an ENI. The embryonic ENI is a neural thread possessing only the most primitive and minimal connectivity.

Method 700 further includes evolving 704 the embryonic ENI towards complex complete connectivity. Specifications of the inter-ENI 106 are developed from the initial embryonic form. Thus a very complex problem that in some embodiments is represented by a complete specification, is replaced by a more simple specification of the embryonic ENI that is evolved to meet increasingly demanding requirements. Progression from an embryonic state to a more complex state avoids the necessity of specifying the complex complete connectivity initially, but rather reduces the problem to one of developing methods to drive the evolution of simple limited connectivity to complex complete connectivity.

An adaptive or evolutionary nature of an artificial intelligence construct in method 700 may be predicated on an active revision of the embryonic ENI to meet external action requirements for a sensory input. In particular, the ENI, which handles both the intra-NBF and inter-NBF connectivity, will evolve due to changing conditions that are either driven by training requirements or operational requirements.

In some embodiments, method 700 is implemented as a computer data signal embodied in a carrier wave, that represents a sequence of instructions which, when executed by a processor, such as processor 904 in FIG. 9, cause the processor to perform the respective method. In other embodiments, method 700 is implemented as a computer-accessible medium having executable instructions capable of directing a processor, such as processor 904 in FIG. 9, to perform the respective method. In varying embodiments, the medium is a magnetic medium, an electronic medium, an optical medium, or other medium known to one of skill in the art.

Hardware and Operating Environments

Figure 8:
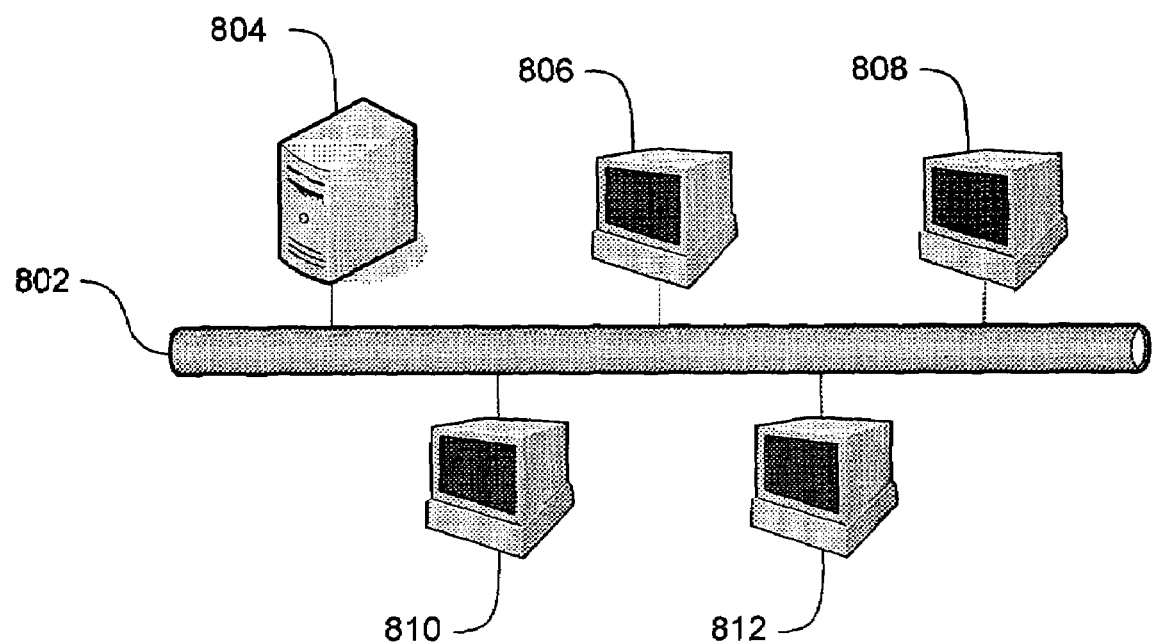
FIG. 8 is a block diagram of a conventional computer cluster environment in which different embodiments of the present invention can be practiced.
Figure 10:
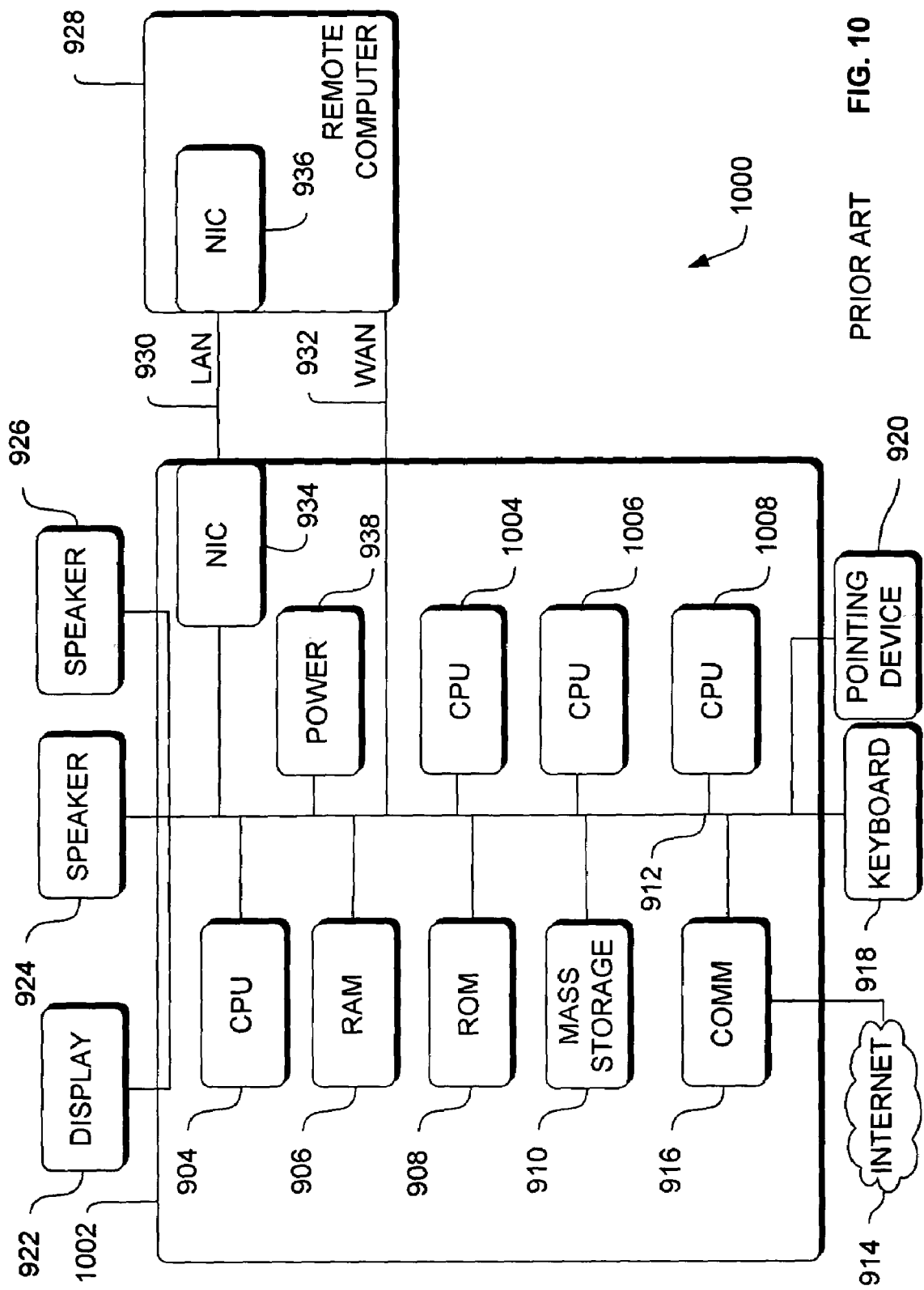
FIG. 10 is a block diagram of a conventional multiprocessor hardware and operating environment in which different embodiments of the present invention can be practiced.

FIGS. 8, 9 and 10 are diagrams of hardware and operating environments in which different embodiments can be practiced. The description of FIGS. 8, 9 and 10 provide an overview of computer hardware and suitable computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

FIG. 8 is a block diagram of a computer cluster environment 800 in which different embodiments can be practiced. System 100, apparatus 200, 300, 400, 500, 600, method 700 and ESNS 1100 and 1200 can be implemented on computer cluster environment 800.

Computer cluster environment 800 includes a network 802, such as an EtherFast 10/100 backbone, that is operably coupled to a cluster server 804 and a plurality of computers 806, 808, 810 and 812. One embodiment of such a computer is computer 902, discussed below with reference to FIG. 9. The plurality of computers may include 8, 16, 32, or 512 computers. Other numbers of computers may also be used. The ESNSs and NBFs described above can be distributed on the plurality of computers and/or processors.

One example of the computer cluster environment 800 is a Beowolf computer cluster. The computer cluster environment 800 provides an environment in which a plurality of ESNSs and NBFs can be hosted in an environment that facilitates cooperation and communication between the ESNSs and the NBFs.

FIG. 9 is a block diagram of a hardware and operating environment 900 in which different embodiments can be practiced. Computer 902 includes a processor 904, commercially available from Intel, Motorola, Cyrix and others. Computer 902 also includes random-access memory (RAM) 906, read-only memory (ROM) 908, and one or more mass storage devices 910, and a system bus 912, that operatively couples various system components to the processing unit 904. The memory 906, 908, and mass storage devices, 910, are types of computer-accessible media. Mass storage devices 910 are more specifically types of nonvolatile computer-accessible media and can include one or more hard disk drives, floppy disk drives, optical disk drives, tape cartridge drives, and other mass storage devices known to one of skill in the art. The processor 904 executes computer programs stored on the computer-accessible media.

Computer 902 can be communicatively connected to the Internet 914 via a communication device 916. Internet 914 connectivity is well known within the art. In one embodiment, a communication device 916 is a modem that responds to communication drivers to connect to the Internet via what is known in the art as a "dial-up connection." In another embodiment, a communication device 916 is an Ethernet® or similar hardware network card connected to a local-area network (LAN) that itself is connected to the Internet via what is known in the art as a "direct connection" (e.g., T1 line, etc.).

A user enters commands and information into the computer 902 through input devices such as a keyboard 918 or a pointing device 920. The keyboard 918 permits entry of textual information into computer 902, as known within the art, and embodiments are not limited to any particular type of keyboard. Pointing device 920 permits the control of the screen pointer provided by a graphical user interface (GUI) of operating systems such as versions of Microsoft Windows(. Embodiments are not limited to any particular pointing device 920. Such pointing devices include mice, touch pads, trackballs, remote controls and point sticks. Other input devices (not shown) can include a microphone, joystick, game pad, satellite dish, scanner, or the like.

In some embodiments, computer 902 is operatively coupled to a display device 922. Display device 922 is connected to the system bus 912. Display device 922 permits the display of information, including computer, video and other information, for viewing by a user of the computer. Embodiments are not limited to any particular display device 922. Such display devices include cathode ray tube (CRT) displays (monitors), as well as flat panel displays such as liquid crystal displays (LCDs). In addition to a monitor, computers typically include other peripheral input/output devices such as printers (not shown). Speakers 924 and 926 provide audio output of signals. Speakers 924 and 926 are also connected to the system bus 912.

Computer 902 also includes an operating system (not shown) that is stored on the computer-accessible media RAM 906, ROM 908, and mass storage device 910, and is and executed by the processor 904. Examples of operating systems include Microsoft Windows®, Apple MacOS®, Linux®, UNIX®. Examples are not limited to any particular operating system, however, and the construction and use of such operating systems are well known within the art.

Embodiments of computer 902 are not limited to any type of computer 902. In varying embodiments, computer 902 comprises a PC-compatible computer, a MacOS®-compatible computer, a Linux®-compatible computer, or a UNIX®-compatible computer. The construction and operation of such computers are well known within the art.

Computer 902 can be operated using at least one operating system to provide a graphical user interface (GUI) including a user-controllable pointer. Computer 902 can have at least one web browser application program executing within at least one operating system, to permit users of computer 902 to access an intranet, extranet or Internet world-wide-web pages as addressed by Universal Resource Locator (URL) addresses. Examples of browser application programs may include Netscape Navigator® and Microsoft Internet Explorer®. Other browser application programs may also be used.

The computer 902 can operate in a networked environment using logical connections to one or more remote computers, such as remote computer 928. These logical connections are achieved by a communication device coupled to, or a part of, the computer 902. Embodiments are not limited to a particular type of communications device. The remote computer 928 can be another computer, a server, a router, a network PC, a client, a peer device or other common network node. The logical connections depicted in FIG. 9 include a local-area network (LAN) 930 and a wide-area network (WAN) 932. Such networking environments are commonplace in offices, enterprise-wide computer networks, intranets, extranets and the Internet.

When used in a LAN-networking environment, the computer 902 and remote computer 928 are connected to the local network 930 through network interfaces or adapters 934, which is one type of communications device 916. Remote computer 928 also includes a network device 936. When used in a conventional WAN-networking environment, the computer 902 and remote computer 928 communicate with a WAN 932 through modems (not shown). The modem, which can be internal or external, is connected to the system bus 912. In a networked environment, program modules depicted relative to the computer 902, or portions thereof, can be stored in the remote computer 928.

Computer 902 also includes power supply 938. Each power supply can be a battery, for example.

FIG. 10 is a block diagram of a multiprocessor hardware and operating environment 1000 in which different embodiments can be practiced. Computer 1002 includes a plurality of microprocessors, such as microprocessor 904, 1004, 1006, and 1008. The four microprocessors of computer 1002 is one example of a multi-processor hardware and operating environment; other numbers of microprocessors are used in other embodiments.

Similar to the computer cluster environment 800 in FIG. 8 above, the computer 1002 provides an environment in which a plurality of ESNSs and NBFs can be hosted in an environment that facilitates cooperation and communication between the ESNSs and the NBFs.

Components of the system 100, apparatus 200, 300, 400, 500, 600, 1100, 1200 and method 700 can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components may execute on one computer, such as, for example, computer 902 in FIG. 9, or on multiple computers.

Figure 11:
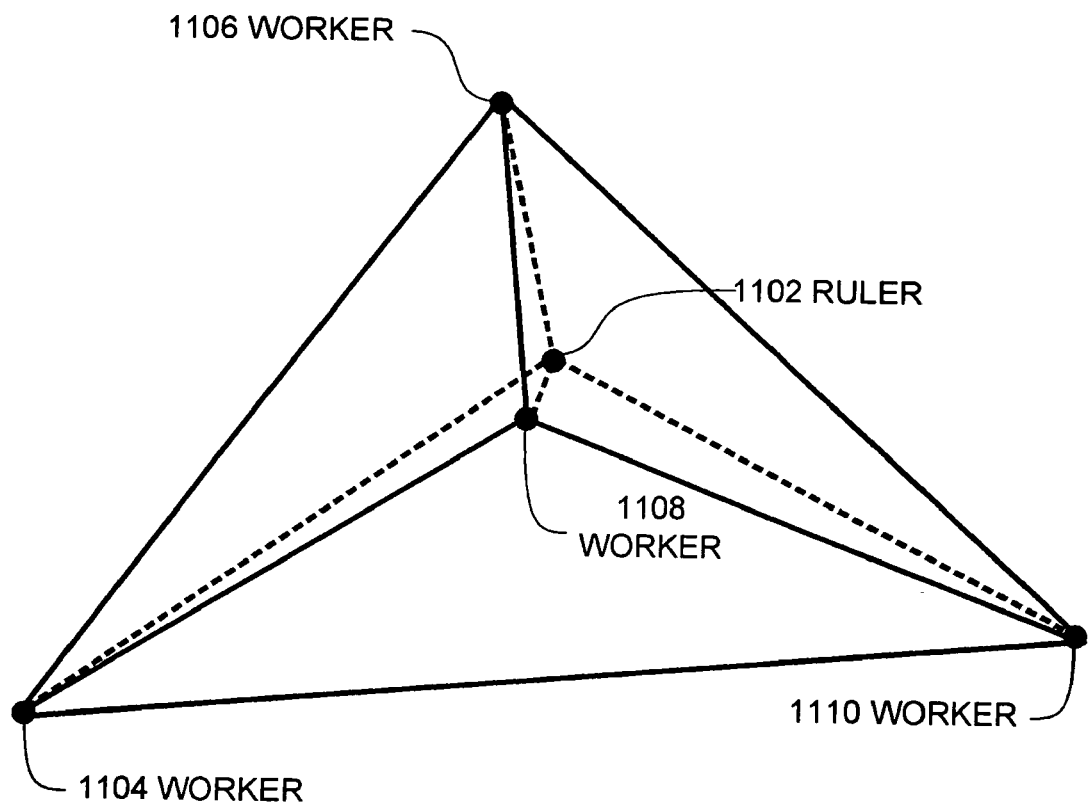
FIG. 11 is a diagram of an embodiment of a three-dimensional hierarchical evolvable synthetic neural system according to the present invention.

Implementation of an Evolvable Synthetic Neural System to a Tetrahedral Architecture Referring to FIG. 11, a particular three-dimensional implementation is described in conjunction with the system overview in FIG. 1 and the apparatus described in FIG. 6. This implementation and others are described in a related application, U.S. Publication No. 2005/0247144A1, application Ser. No. 11/108,627 filed Apr. 8, 2005 entitled "Reconfigurable Structure," which is incorporated herein by reference in its entirety.

FIG. 11 is a diagram of a three-dimensional (3D) hierarchical evolvable synthetic neural system (ESNS) 1100 according to an embodiment.

The 3D hierarchical ESNS 1100 includes a ruler subsystem 1102 and four worker subsystems 1104, 1106, 1108 and 1110. Each subsystem in the 3D hierarchical ESNS 1100 includes one or more ESNSs such as system 100 or ESNS 600.

The three-dimensional architecture of 3D hierarchical ESNS 1100 provides a three-dimensional complexity. An implementation of ESNS 600 on a microprocessor, such as microprocessor 904 shown in FIG. 9, provides a synthetic neural system that reconciles the two dimensional nature of microprocessor technologies to the three dimensional nature of biological neural systems.

Implementation of Single Instrument Spacecraft to Prospect Asteroid Belts

Figure 12:
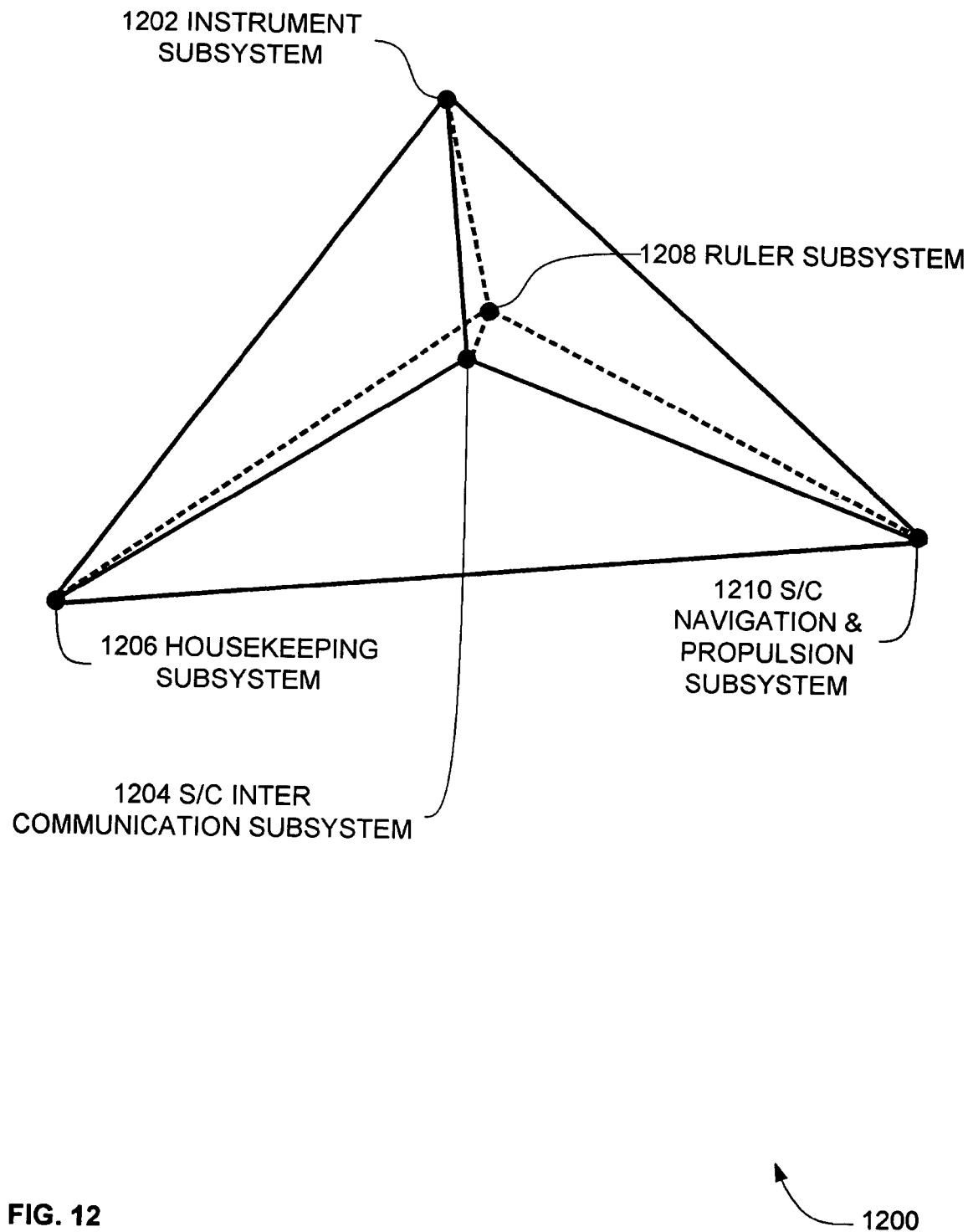
FIG. 12 is a diagram of an embodiment of a heuristic neural system according to the present invention for a single instrument spacecraft to prospect asteroid belts.

Referring to FIG. 12, a particular three-dimensional implementation for asteroid prospecting is described in conjunction with the system overview in FIG. 1 and the apparatus described in FIG. 6.

FIG. 12 is a diagram of a heuristic neural system (HNS) 1200 according to an embodiment for a single instrument spacecraft to prospect asteroid belts.

Each spacecraft is controlled by a subset of NBFs (SNBF) which in aggregate provides the behavior of a subsystem of the mission. For example, a solar sailing SNBF 1202 controls sail deployment and subsequent configuration activity much as terrestrial sailors perform navigation and manage propulsion. A spacecraft inter communication subsystem SNBF 1204 controls communication with other workers and rulers. Also, a housekeeping SNBF 1206 controls the spacecraft housekeeping. HNS 1200 also includes a ruler subsystem 1208 to coordinate all activities. Similarly, a spacecraft navigation and propulsion subsystem 1210 controls the navigation and propulsion, matching the navigation and propulsion to the current objectives.

Each spacecraft is a worker in a totally autonomous space mission. The space mission is configured as an autonomous nanotechnology swarm (ANTS). Each spacecraft in an ANTS has a specialized mission, much like ants in an ant colony have a specialized mission. Yet, the HNS architecture of each worker in an ANTS provides coordination and interaction between each HNS that yields performance of the aggregate of the ANTS that exceeds the performance of a group of generalist workers.

More specifically, the SNBFs within HNS 1200 have a hierarchical interaction among themselves much as the workers do in the entire ANTS collective. Hence, although many activities of the spacecraft would be controlled by individual SNBFs, a ruler SNBF coordinates all of the SNBFs to assure that spacecraft objectives are met. Additionally, to have redundancy for the s/c mission, inactive workers and rulers only participate if a member of their type is lost. Also a hierarchical worker node may collapse to a non-hierarchical one, if all of the available subrulers for that node are lost.

In one particular application of an ANTS, a prospecting asteroid mission (PAM) surveys a large population or surface area targets, such as mainbelt asteroids. The primary objective of a PAM is exploration of the asteroid belt in search of resources and material with astrobiologically relevant origins and signatures. The PAM may include a swarm of approximately 1000 spacecraft that includes approximately 10 types of specialist workers (e.g., HNS 1200) with a common spacecraft bus that is organized into 10 subswarms of approximately 100 spacecraft each, having approximately 10 specialist HNSs.

In some embodiments, each individual spacecraft in a PAM weighs 1 kilogram or less with a one meter diameter body and 100 meter$^2$ sails when fully deployed. Each spacecraft is packaged into a 10 cm$^2$ sided cube. A 1000-spacecraft swarm will fit into 1 meter$^3$ weighing 1000 kilograms in deployment. Each spacecraft also includes a solar sail propulsion system that requires no expendable supplies and a small nuclear battery that provides sufficient power to each worker. Thus, the prospecting asteroid mission is self-directed and may possibly be self-sustaining for tens of years.

CONCLUSION

An evolvable synthetic neural system (ESNS) is described. In some embodiments, the ESNS provides a hierarchical approach to the collective interactions of a number of specialized workers who as an ensemble accomplish defined goals and objectives while reducing the dynamic range of behaviors required for a given worker. Furthermore, in some embodiments, each type of worker includes a bi-level intelligence: (1) a high level neural system designed to direct the accomplishment of objective related tasks, and (2) an autonomic neural system which functions to enable required motor activities and related functions much as in biological systems.

In some embodiments, an ESNS integrates neural functions at both high and lower levels and adapts to conditions brought about by changing success criteria for goals and objectives or by degradation of associated systems. In some embodiments, behavior patterns of varying complexity are achieved by using sets of evolvable synthetic neural systems as neural basis functions that are interconnected and are operated in a hierarchical manner. In some embodiments in which the neural basis functions (NBFs) are two-dimensional, a complete hierarchical neural system of a worker composed of sets of NBFs is executed as a three-dimensional simulation of a neural system in a two-dimensional chip-based processor array for workers with systems composed of more than three subsystems.

In some embodiments, a hierarchical ESNS has self-similarity in that any node of the ESNS is composed of a subset of NBFs, which in turn possess a subruler NBF, which is the point of contact with other nodes and coordinates the activities of other NBFs within that node. In some embodiments, a node may lack neural self-similarity. In that case, worker NBFs within a node communicate directly with all other nodes including the ruler NBF and function without any subruler NBF coordination.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all environments and alternate technologies which provide the same functionality as described herein.

What is claimed is:

1. A computer-accessible medium having executable instructions to manage collective interactions between autonomous entities, the computer-accessible medium comprising:
   computer executable program code to generate algorithms to manage said collective interactions between autonomous entities, said algorithms including;
   a first plurality of neural basis functions controlling a corresponding robotic device in turn controlling at least one action in response to sensory input data; and
   a first evolvable neural interface operably coupled to each of the first plurality of neural basis functions to selectively establish communication between said first plurality of neural basis functions;
   wherein a first one of said plurality of neural basis functions is autonomously reconfigured during a learning process in response to said selectively established communication with a second one of said plurality of neural basis functions and thereafter change the control of said robotic device.

2. The computer-accessible medium of claim 1, wherein one of the first plurality of neural basis functions further comprises: a ruler neural basis function.

3. The computer-accessible medium of claim 2, wherein the evolvable synthetic neural system further comprises: a second plurality of neural basis functions, wherein the ruler neural basis function further comprises: a communication link to the second plurality of neural basis functions.

4. The computer-accessible medium of claim 1, wherein at least one of the first plurality of neural basis functions further comprises:

a heuristic neural system to control at least one high level action in response to sensory input data; and an autonomic neural system to control at least one low level action in response to sensory input data; and a second evolvable neural interface selectively establishing communication between said heuristic neural system and said autonomic neural functions; wherein one of said heuristic and autonomic neural basis functions are autonomously reconfigured during a learning process in response to selective communication with another of said heuristic and autonomic neural basis functions.

5. The computer-accessible medium of claim 4, wherein the heuristic neural system and the autonomic neural system in aggregate provide a function of a biological neural system.

6. The computer-accessible medium of claim 4, wherein the heuristic neural system comprises: a neural net operable to perform pattern recognition; and a fuzzy logic package operable to perform decisions based on recognitions.

7. The computer-accessible medium of claim 6, wherein the neural net and the fuzzy logic package form a basis for a higher level heuristic intelligence.

8. The computer-accessible medium of claim 4, further comprising: a first self assessment loop operably coupling the second evolvable neural interface and the heuristic neural system; a first genetic algorithm operably coupling the second evolvable neural interface and the heuristic neural system, the first genetic algorithm operable to modify the second evolvable neural interface to satisfy requirements of the first self assessment loop during learning and task execution; a second self assessment loop operably coupling the second evolvable neural interface and the autonomic neural system; and a second genetic algorithm operably coupling the second evolvable neural interface and the autonomic neural system, the genetic algorithm operable to modify the second evolvable neural interface to satisfy requirements of the second self assessment loop during learning and task execution.

9. The computer-accessible medium of claim 4, further comprising: a core heuristic genetic code operably coupled to the heuristic neural system; a first self assessment loop operably coupling the core heuristic genetic code and the heuristic neural system; and a first genetic algorithm operably coupling the core heuristic genetic code and the heuristic neural system, the first genetic algorithm operable to modify the heuristic neural system.

10. The computer-accessible medium of claim 4, further comprising: a core autonomous genetic code operably coupled to the autonomic neural system; a first self assessment loop operably coupling the core autonomous genetic code and the autonomic neural system; and a first genetic algorithm operably coupling the core autonomous genetic code and the autonomic neural system, the first genetic algorithm operable to modify the autonomous neural system.

11. The computer-accessible medium of claim 4, wherein each of said heuristic and autonomic neural basis functions are autonomously reconfigured during a learning process in response to selective communication there between.

12. An computer-accessible medium to manage collective interactions between autonomous entities, the computer-accessible medium comprising:

computer executable program code to generate algorithms, said algorithms including;

at least one neural basis functions operable to control a corresponding robotic device in turn controlling at least one action in response to sensory input data, at least one ruler neural basis function that is capable of establishing and removing links to other similarly configured evolvable synthetic neural systems; and a first evolvable neural interface operably coupled to said at least one neural basis function and said at least one ruler neural basis function and selectively establishes communication there between and thereby facilitating autonomously reconfiguration of said at least one neural basis function during a learning process and thereafter change the control of said robotic device.

13. The evolvable synthetic neural system of claim 12, wherein each said at least one neural basis functions comprises a second evolvable neural interface, the second evolvable neural interface comprising: a communication link between a heuristic neural system and an autonomic neural system of said at least one neural basis functions.

14. An computer-accessible medium, comprising:

computer executable program code to generate algorithms, said algorithms including;

at least one neural basis function operable to control a corresponding robotic device in turn controlling at least one action in response to sensory input data, wherein said at least one neural basis function comprises:

an evolvable neural interface;

a heuristic neural system operably coupled to the evolvable neural interface; and an autonomic neural system operably coupled to the evolvable neural interface, wherein the heuristic neural system and the autonomic neural system in aggregate provide a function of a biological neural system by autonomous reconfiguration during a learning process in response to selective communication with said evolvable neural interface and thereafter change the control of said robotic device.

15. The computer-accessible medium of claim 14, wherein the evolvable neural interface further comprises: a communication link between the heuristic neural system and the autonomic neural system.

16. The computer-accessible medium of claim 14, wherein the heuristic neural system comprises: a neural net operable to perform pattern recognition; and a fuzzy logic package operable to perform decisions based on recognitions.

17. The computer-accessible medium of claim 16, wherein the neural net and the fuzzy logic package form a basis for a higher level heuristic intelligence.

18. The computer-accessible medium of claim 14, further comprising: a first self assessment loop operably coupling the evolvable neural interface and the heuristic neural system; a first genetic algorithm operably coupling the evolvable neural interface and the heuristic neural system, the first genetic algorithm operable to modify the evolvable neural interface to satisfy requirements of the first self assessment loop during learning and task execution; a second self assessment loop operably coupling the evolvable neural interface and the autonomic neural system; and a second genetic algorithm operably coupling the evolvable neural interface and the autonomic neural system, the genetic algorithm operable to modify the evolvable neural interface to satisfy requirements of the second self assessment loop during learning and task execution.

19. The computer-accessible medium of claim 14, further comprising: a core heuristic genetic code operably coupled to the heuristic neural system; a first self assessment loop operably coupling the core heuristic genetic code and the heuristic neural system; and a first genetic algorithm operably coupling the core heuristic genetic code and the heuristic neural system, the first genetic algorithm operable to modify the heuristic neural system.

20. The computer-accessible medium of claim 14, further comprising: a core autonomous genetic code operably coupled to the autonomic neural system; a first self assessment loop operably coupling the core autonomous genetic code and the autonomic neural system; and a first genetic algorithm operably coupling the core autonomous genetic code and the autonomic neural system, the first genetic algorithm operable to modify the autonomous neural system.

21. An autonomous nanotechnology swarm, comprising:
first plurality of self-similar workers each including at least one processor executing program code, said program code including;
a first plurality of neural basis functions to control a corresponding robotic device in turn controlling at least one action in response to sensory input data; and
an evolvable neural interface operably coupled to each of the first plurality of neural basis functions to selectively establish communication between said first plurality of neural basis functions.

22. The autonomous nanotechnology swarm of claim 21, wherein each worker further comprises:
a spacecraft associated with said corresponding robotic device, said corresponding robotic device including a deployable solar sail and a propulsion system; said program code further including;
a solar sailing subset of neural basis functions operable to control sail deployment and subsequent configuration activity;
a spacecraft inter communication subset of neural basis functions operable to control communication with a second plurality of self-similar workers;
a housekeeping subset of neural basis functions operable to control spacecraft housekeeping;
a ruler subset of neural basis functions operable to coordinate all activities; and
a spacecraft navigation and propulsion subset of neural basis functions operable to control navigation and propulsion.

23. A computer-accessible medium having executable instructions to manage collective interactions between autonomous entities, the executable instructions comprising:
a first module including at least one processor executing program code and establishing a plurality of autonomous neural basis functions, each autonomous neural basis function to control a corresponding robotic device in turn controlling at least one action in response to sensory input;
a second module for instantiating an embryonic evolvable neural interface; and
a third module for evolving the embryonic evolvable neural interface to establish complex connectivity between said plurality of autonomous neural basis functions and facilitate autonomous reconfiguration of said neural basis functions and thereafter change the control of said robotic device.

24. The computer-accessible medium of claim 23, wherein the embryonic evolvable neural interface further comprises: a neural thread possessing minimal connectivity.

* * * * *